No. 844,499. PATENTED FEB. 19, 1907.
A. W. CRAM.
BEATER OR MIXER.
APPLICATION FILED MAY 22, 1905.

Witnesses:
H. B. Davis
C. Doyle

Inventor:
Alonzo W. Cram
by Noyes & Harriman
Attys

UNITED STATES PATENT OFFICE.

ALONZO W. CRAM, OF HAVERHILL, MASSACHUSETTS.

BEATER OR MIXER.

No. 844,499.      Specification of Letters Patent.      Patented Feb. 19, 1907.

Application filed May 22, 1905. Serial No. 261,540.

*To all whom it may concern:*

Be it known that I, ALONZO W. CRAM, of Haverhill, county of Essex, State of Massachusetts, have invented an Improvement in Beaters or Mixers, of which the following description, in connection with the accompanying drawings, is a specification, like characters on the drawings representing like parts.

This invention relates to a form of culinary implement which is especially adapted to be used as a beater or mixing device; and my invention has for its object to produce a hand implement for this purpose which is effective in operation and durable and which is inexpensive to manufacture. I accomplish this object by the means shown in the accompanying drawings, in which—

Figure 1:
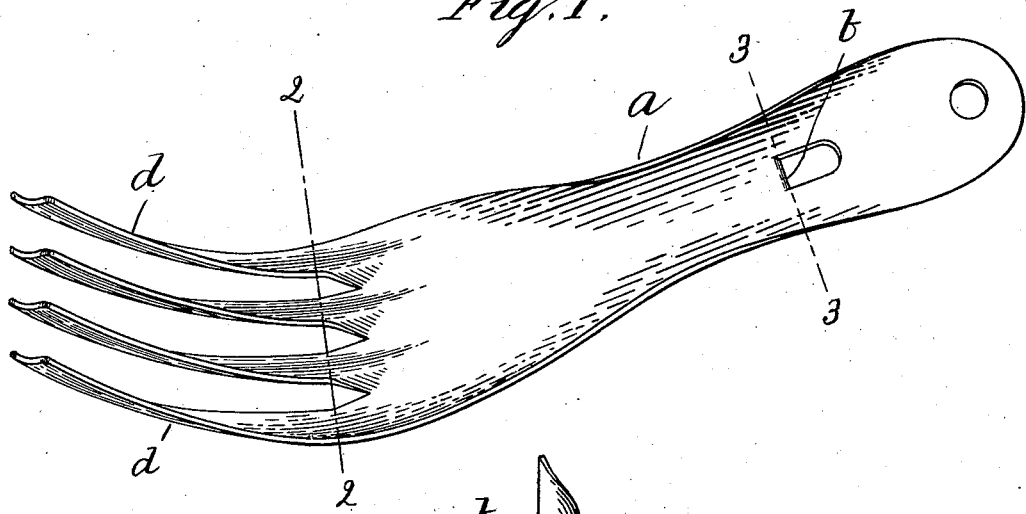
Figure 2:
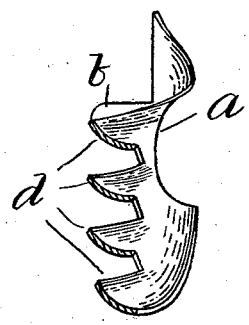
Figure 3:
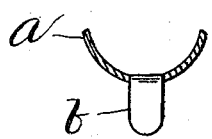

Figure 1, perspective view of my device; and Figs. 2 and 3 are, respectively, cross-sections on lines 2 2 and 3 3 of Fig. 1.

As shown in the drawings, the implement is composed of a handle *a*, which is flattened at the end and which has its longitudinal edges bent toward each other to form a concave middle portion. A lug *b* is formed by bending a portion of the handle at right angles to the main body thereof adjacent its flattened end to enable the user to hold the device firmly in the hand. The general formation of the handle is such that when it is held in the natural position in the hand it will be held in what may be termed the "plane of use," which is approximately perpendicular to the path in which the device will be moved in use. A series of blades or tines *d* are formed integral with the shank end of the handle and extend longitudinally thereof, they being disposed approximately in parallelism and having a twisted portion adjacent their points of connection with the handle, so that the main portions thereof are also disposed obliquely to the said plane of use of the handle, with their lower longitudinal edges toward the front when in the position of use. While the blades may be flat and serve the purpose satisfactorily, yet I preferably make them concaved transversely on the sides, which are uppermost when the device is held in the position for use to provide a longitudinally-extending groove in each blade, which extends from a point on the shank of the handle to the end of the blade, so that the blades will have greater strength to resist transverse strain and for other reasons to be hereinafter explained. The blades are also curved longitudinally in the plane of use of the handle, so that the convex edges will be at the lower sides of blade when the device is held in the hand. This enables the lower blade to conform to the curved inner surface of the receptacle containing the material which is beaten or mixed.

With my device as the series of mixing-blades are upwardly inclined from what is the lower edge of the device when in the position of use and also are obliquely disposed to the path in which they are moved in use the material to be mixed or beaten is caused to pass up, over, and between said blades as they are passed therethrough, thereby causing an effective mixing or beating thereof. The concave formation of the blades causes them each to have a similar mixing action to that of a spoon, but does not cause the material to be retained therein, as it would be in the bowl of a spoon.

The whole device can readily be stamped from a sheet of metal, so that it may be made at a small expense.

Having described my invention, what I claim as new, and desire to secure by Letters Patent of the United States, is as follows:

1. A mixing device or beater consisting of a handle adapted to be held in a predetermined plane or position of use, a series of approximately parallel blades extending longitudinally of the handle from one end thereof, said blades being obliquely disposed to said plane with only their lower longitudinal edges at the front side of the device, substantially as described.

2. A mixing device or beater consisting of a handle adapted to be held in a predetermined plane or position of use, a series of approximately parallel blades extending longitudinally of the handle from one end thereof, said blades being obliquely disposed to said plane with only their lower longitudinal edges at the front side of the device, and said blades being transversely concaved on their upper sides to provide longitudinally-extending grooves therein, substantially as described.

3. A mixing device or beater consisting of a handle adapted to be held in a predetermined plane or position of use, a series of approximately parallel blades extending longitudinally of the handle from one end thereof, said blades being obliquely disposed to said plane with only their lower longitudinal edges at the front side of the device, and said blades being transversely concaved on their upper sides to provide longitudinally-extending grooves therein, and being curved upwardly approximately in said plane, substantially as described.

4. An implement embodying a plurality of longitudinally and transversely curved tines.

5. An implement embodying a plurality of longitudinally-curved and obliquely-disposed tines.

6. An implement embodying a plurality of transversely-curved and obliquely-disposed tines.

7. An implement embodying a plurality of longitudinally and, transversely curved and obliquely-disposed tines.

8. An implement embodying a plurality of longitudinally and horizontally curved tines.

9. An implement embodying a plurality of longitudinally, horizontally and transversely curved tines.

10. An implement embodying a plurality of longitudinally and horizontally curved and obliquely-disposed tines.

11. An implement embodying a plurality of longitudinally, horizontally, transversely curved and obliquely-disposed tines.

12. An implement embodying a curved handle, and a plurality of longitudinally, horizontally and transversely curved and obliquely-disposed tines.

In testimony whereof I have signed my name to this specification in the presence of two subscribing witnesses.

ALONZO W. CRAM.

Witnesses:
L. H. HAMMAN,
H. B. DAVIS.